United States Patent [19]
Roberts

[11] 3,830,532
[45] Aug. 20, 1974

[54] COMPRESSION TYPE TUBE END CONNECTION

[75] Inventor: Arnold E. Roberts, Statesboro, Ga.

[73] Assignee: Aeroquip Corporation, Jackson, Mich.

[22] Filed: July 7, 1972

[21] Appl. No.: 269,533

[52] U.S. Cl............................. 285/341, 285/382.7
[51] Int. Cl............................................. F16l 17/00
[58] Field of Search................... 285/341, 382-287, 285/342, 343, 351

[56] References Cited
UNITED STATES PATENTS

| | | | |
|---|---|---|---|
| 2,473,118 | 6/1949 | Wolfrom | 285/342 |
| 2,536,745 | 1/1951 | Herold | 285/341 |
| 2,693,376 | 11/1954 | Wurzburger | 285/382.7 X |
| 3,195,933 | 7/1965 | Jacobs | 285/342 X |

FOREIGN PATENTS OR APPLICATIONS

| | | | |
|---|---|---|---|
| 1,179,062 | 10/1964 | Germany | 285/341 |
| 38,350 | 6/1936 | Netherlands | 11/382.7 |

*Primary Examiner*—Dave W. Arola
*Attorney, Agent, or Firm*—Harness, Dickey & Pierce

[57] ABSTRACT

A fluid-tight connection which enables an open tube end to be secured to a fitting in the field without soldering. The connection comprises a body having a bore for receiving the tube end, the bore having wider and narrower portions with a tapered portion therebetween A ferrule and a nut are slipped onto the tube which is inserted in the body bore against a shoulder. The ferrule has a thin-walled forward section which will be deflected inwardly by the tapered bore portion as the nut is tightened, biting into the tube wall to form a primary seal between the ferrule and tube. A sharp edge on the body digs into a tapered surface on the ferrule to form a primary seal between these two parts. A backup seal between the ferrule and tube is formed by a weakened rearward ferrule section forced inwardly by a tapered surface on the nut.

3 Claims, 2 Drawing Figures

PATENTED AUG 20 1974　　3,830,532

COMPRESSION TYPE TUBE END CONNECTION

BACKGROUND OF THE INVENTION

The invention relates to the connections of open-ended tubes such as copper tube used in air-conditioning and refrigeration systems to valves, fittings or other components of systems without the use of solder.

BRIEF SUMMARY OF THE INVENTION

It is an object of the invention to provide a novel and improved connection between open-ended tubes and bodies which can be effectuated in the field without soldering and which will achieve a fluid-tight connection suitable for refrigerants as well as other liquids and gases.

It is another object to provide an improved connection of this type which is economical and easy to install.

DESCRIPTION OF THE PREFERRED EMBODIMENT

Figure 1:
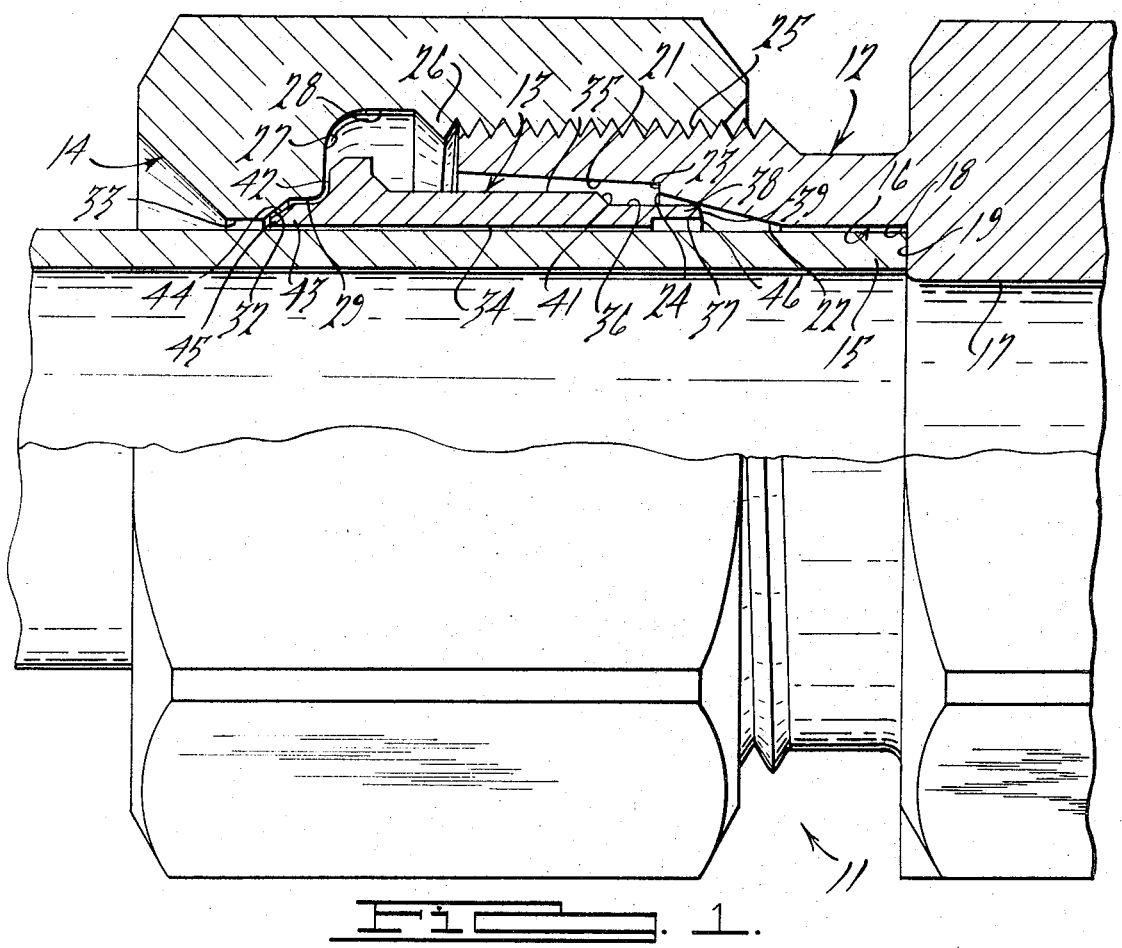
FIG. 1 is a cross-sectional view of an elevation showing the parts of the connection in assembled but untightened position.

The connection is generally indicated at 11 and comprises a body generally indicated at 12, a ferrule generally indicated at 13 and a nut generally indicated at 14. The connection is intended to seal an open-ended tube 15 to body 12 without solder. Body 12 which may be part of a valve, fitting or other component of a fluid system, is provided with a bore generally indicated at 16 leading to its passage 17. Bore 16 has a relatively narrow first portion 18 separated from passage 17 by a radial shoulder 19, and a slightly flared outer portion 21. Bore portions 18 and 21 are connected by a tapered portion 22, a radial shoulder 23 being provided between this tapered portion and the slightly flared portion 21. A sharp edge or corner 24 is formed between shoulder 23 and tapered portion 22. The diameter of bore portion 18 is such that tube 15 may be inserted therein and engage shoulder 19. The outer portion of body 12 surrounding bore portions 21 and 22 has an external thread 25.

Nut 14 has an internally threaded portion 26 for mounting on body portion 25, and an inwardly extending radial shoulder 27, an enlarged bore portion 28 being formed between portions 26 and 27. A relatively narrow bore portion 29 is formed inwardly of shoulder 27, a rounded portion 31 being formed therebetween. A tapered bore portion 32 extends inwardly from bore portion 29 and terminates in a narrow bore portion 33 which will still permit clearance of tube 15.

Ferrule 13 is of generally tubular shape, having an internal bore 34 along most of its length of substantially the same diameter as body bore portion 18. The ferrule is preferably fabricated of a material such as brass which will permit it to carry out the functions about to be described. The external surface 35 of ferrule 13 has a diameter which will enable it to enter body bore portion 21 after it has been slipped onto tube 15 together with nut 14. The forward outer surface portion 36 of the ferrule is narrower in diameter than edge 24 so that the forward end of the ferrule will initially engage tapered bore portion 22 of the body. Part of this forward portion of the ferrule has an enlarged bore indicated at 37, section 38 of the ferrule thus being weakened in resistance to inward bending. The forward surface 39 of the ferrule has a slight rake so that it will be approximately at right angles to the tube axis after inward deflection.

Surfaces 35 and 36 of the ferrule have a tapered connecting surface 41 of such diameter that it will be engaged by edge 24 of the body when nut tightening takes place. An outwardly extending radial shoulder 42 is formed on the ferrule for engagement by shoulder 27 of the nut. Rearward portion 43 of the ferrule has a thinner cross-section than the main portion by virtue of its narrower outside diameter, and a tapered end surface 44 of portion 43 is engageable by tapered shoulder 32 of the nut. The taper angle of surface 44 is somewhat less than that of surface 32 so that a camming action will take place upon tightening of the nut, forcing weakened section 43 radially inwardly.

Figure 2:
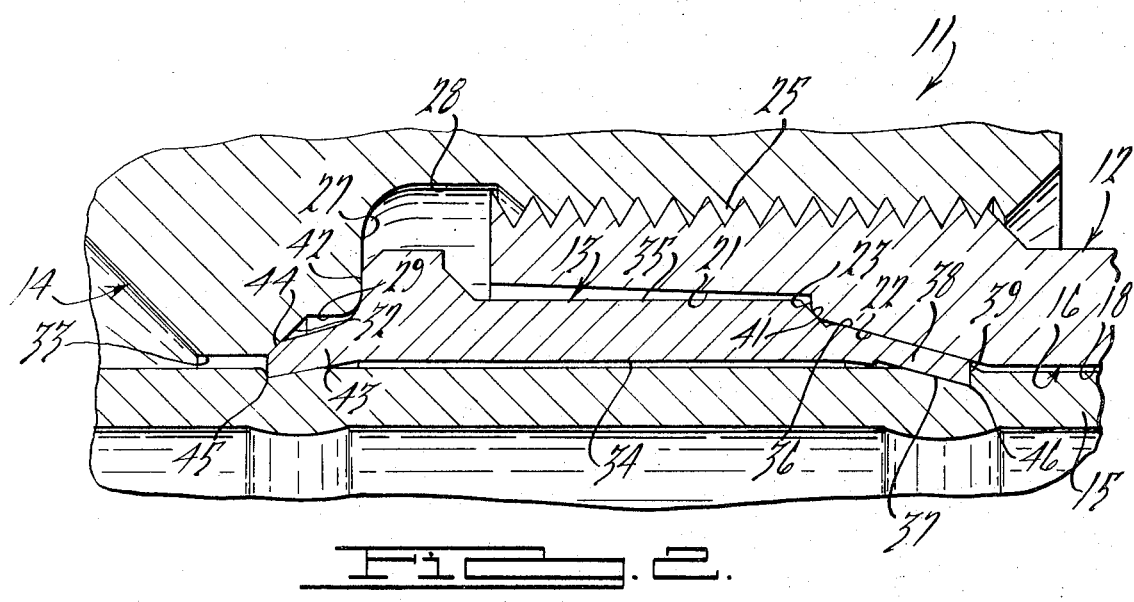
FIG. 2 is a view similar to FIG. 1 but showing the nut tightened and the parts engaging each other to form the connection seals.

In operation, after slipping nut 14 and ferrule 13 onto tube 15, the latter will be inserted into the bore of body 12, the slight taper of bore portion 21 facilitating entry. The end of tube 15 will engage shoulder 19 of the body bore (FIG. 1). As the nut is tightened from its FIG. 1 to its FIG. 2 position, tapered nut surface 32 will engage ferrule surface 44, deflecting ferrule portion 43 radially inwardly until edge 45 of the ferrule bites into the external surface of the tube. Shoulder 27 of the nut will engage shoulder 42 of the ferrule, forcing the ferrule axially into the body bore. This movement will cause tapered surface 22 of the body bore to deflect ferrule section 38 radially inwardly until edge 46 of the ferrule bites into the external surface of tube 15. In its deflected position, forward surface 39 of the ferrule will be substantially at right angles to the tube axis, thus resisting any axial separating force between the body and tube. At the same time, edge 24 of the body will engage tapered surface 41 of the ferrule, this sharp edge contacting surface 41 to give a very tight metal-to-metal primary seal between the ferrule and body. The primary seal between the ferrule and tube will be formed by the edge 46 of the ferrule which digs into the outer surface of tube 15 in the manner shown in FIG. 2. A backup seal between the ferrule and tube will be formed by edge 45 of the ferrule which is pressed into tube 15.

What is claimed is:

1. In a compression type connection between an open tube end and a body having a bore, a tapered portion in said bore, a shoulder in said bore engaged by the tube end, an external thread on said body, a nut on said tube threadably engaging said body, a ferrule on said tube between said nut and body, the nut and ferrule having opposing shoulders whereby nut tightening will force the ferrule into the body bore, a weakened section at the forward end of said ferrule engageable with said tapered portion of the body bore, said last-mentioned portion being more sharply tapered than said weakened section whereby nut tightening will force the outer porton of this weakened section radially inwardly until the forward edge of the ferrule bites into the outer tube surface to form a primary seal between the ferrule and tube, a tapered sealing surface on the ferrule rearwardly of and axially spaced from the entire weakened portion and more sharply tapered than said weakened portion, a sharp edge in the body bore formed by a radial shoulder at the wider end of said tapered body bore portion and engageable with said tapered ferrule sealing surface upon nut tightening to form a primary seal between the ferrule and body, a weakened rearward section on said ferrule, and a tapered surface on said nut engageable with said last-mentioned ferrule section when the nut is tightened, whereby the outer portion of this section will be deflected inwardly to bite into the outer tube surface only at its rearmost edge and form a backup seal between the ferrule and tube, all portions of said ferrule between said outer portions of the forward and rear weakened sections being of sufficient radial thickness as to be undeflected radially inwardly when the nut is tightened.

2. The combination according to claim 1, said rearward weakened ferrule section having a tapered surface facing the tapered nut surface but with a slightly lesser angle of taper than that of the tapered nut surface.

3. The combination according to claim 1, the forward end surface of said ferrule being slightly raked, whereby said end surface will be substantially at right angles to the tube axis after the forward weakened portion of the ferrule has been deflected inwardly, resisting any separating force between the body and tube.

* * * * *